Aug. 28, 1951 E. E. MASTERSON 2,566,091

SLIDING CARRIAGE PICKUP ASSEMBLY

Filed July 30, 1949 3 Sheets-Sheet 1

INVENTOR

Earl E. Masterson

BY Morris A. Rabkin

ATTORNEY

Aug. 28, 1951 E. E. MASTERSON 2,566,091

SLIDING CARRIAGE PICKUP ASSEMBLY

Filed July 30, 1949 3 Sheets-Sheet 2

INVENTOR
Earl E. Masterson
BY
Morris A. Rabain
ATTORNEY

SLIDING CARRIAGE PICKUP ASSEMBLY

Filed July 30, 1949 3 Sheets-Sheet 3

INVENTOR
Earl E. Masterson
BY Morris A. Rabin
ATTORNEY

Patented Aug. 28, 1951

2,566,091

UNITED STATES PATENT OFFICE 2,566,091

SLIDING CARRIAGE PICKUP ASSEMBLY

Earl E. Masterson, Palmyra, N. J., assignor to Radio Corporation of America, a corporation of Delaware Application July 30, 1949, Serial No. 107,771

16 Claims. (Cl. 274—14)

Figure 1:
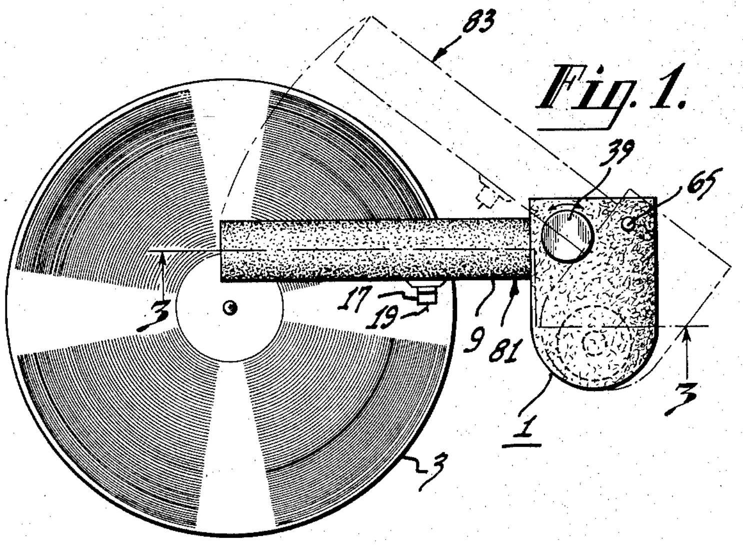

This invention relates to phonographic apparatus, and more particularly to a sliding carriage pick-up assembly therefor.

Phonographs employing sliding carriage pick-up assemblies generally comprise a track or guide rod upon which a carriage is slidably mounted and capable of travelling longitudinally thereof. The track or guide is mounted on a reference base of the phonograph to one side of the turntable for swinging or pivotal movement to and from a position radially over the turntable. A suitable pick-up unit is mounted on the carriage so that the stylus or needle may engage and radially traverse the grooved area of a disc phonograph record supported for rotation on the turntable in order to reproduce the sound signals recorded thereon in a manner well known in the art.

Irrespective of the many advantages provided by prior art sliding carriage pick-up assemblies, difficulty is encountered in protecting the record and the pick-up stylus from damage, especially during the process of changing records. In many devices, when the pick-up assembly is moved from its operative position over the record to one side of the turntable, the human factor is relied upon to lift the pick-up and its stylus from the record. If this is neglected, the stylus will drag across the face of the record and cause damage to either the record or the stylus and pick-up, or both. In other devices having mechanical means for disengaging the stylus from the record, there is no safety device provided for preventing the stylus from being lowered when it is moved to positions other than its operating position, and the stylus and pick-up are also in danger of damage due to catching on the edge of the turntable.

It is, therefore, the primary object of my present invention to provide a sliding carriage pick-up assembly which will overcome the above as well as other disadvantages of prior art sliding carriage pick-ups.

It is also an object of my present invention to provide a sliding carriage pick-up assembly with a safety disengaging mechanism to prevent damage to the record as well as to the reproducing apparatus.

It is a further object of my present invention to provide an automatic means for disengaging the stylus from a record upon movement of the sliding carriage assembly away from its operative position with respect to the record.

Still another object of my present invention is to provide a safety device for sliding carriage pick-up assemblies which will prevent lowering of the pick-up and stylus upon the record unless it is in an operating position.

Another object of my invention is to provide a sliding carriage pick-up assembly which is simple and easy to construct, which is highly efficient in use and which can be constructed at a minimum of cost.

In accordance with my present invention, I provide a sliding carriage pick-up assembly which is pivotally mounted on a reference base of a phonograph and, in its normal playing position, extends in a radial direction across the phonograph turntable. The pick-up assembly comprises a pivotal support having a guide bar rotatably carried thereby and disposed in spaced, parallel relation with respect to and radially above the turntable. A pick-up device of any suitable kind, having a stylus for engaging the sound groove of the phonograph record, is attached to a carriage which is slidably and pivotally mounted on the rotatable guide rod for movement longitudinally thereof so that the stylus can traverse a radial path across the record. Disengaging mechanism is also carried by the pivotal support, being pivotally mounted thereon and disposed parallel to the guide rod. The disengaging mechanism is arranged to engage the sliding carriage in such a manner that it will tilt the carriage on the guide rod and lift the stylus from the record. The disengaging rod may be in the form of a lead screw rotatably mounted on the support, with means for operating the same, and providing a mechanical means for positioning the carriage in a predetermined position along the guide rod with respect to the record. The disengaging means is arranged in a manner such that it may be operated either manually or mechanically. There is also provided means for locking the carriage in its disengaged position.

Figures 2, 9, 10:
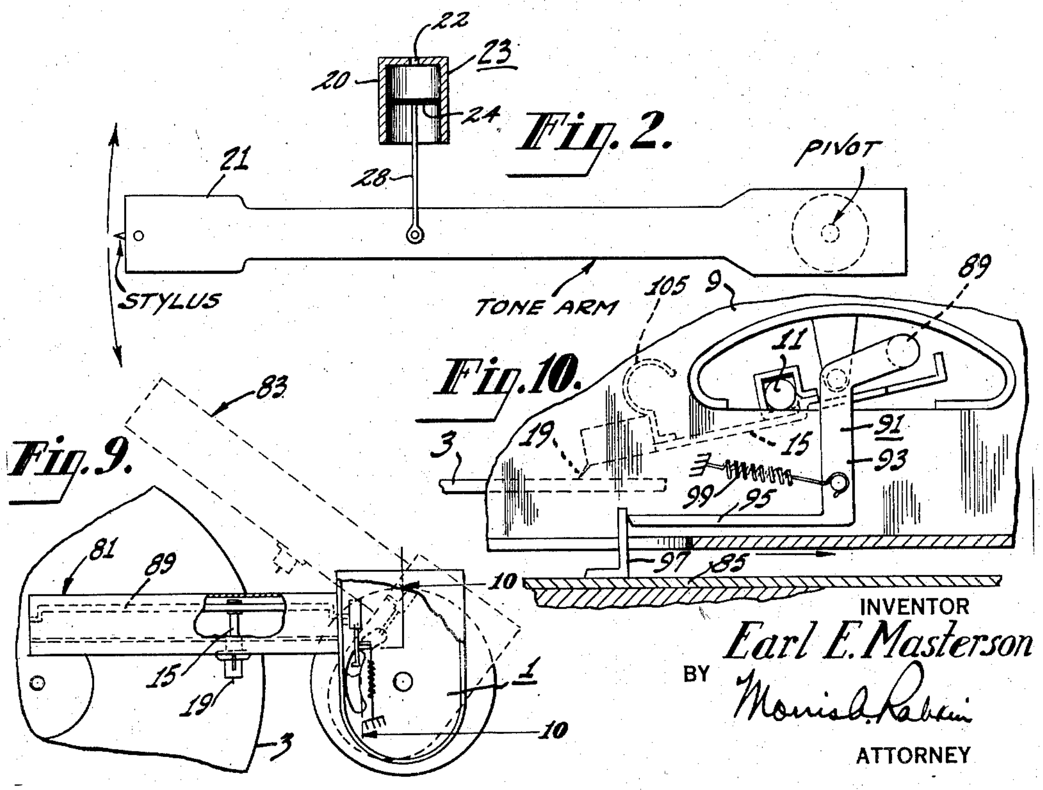
Figures 3, 4, 5, 11:
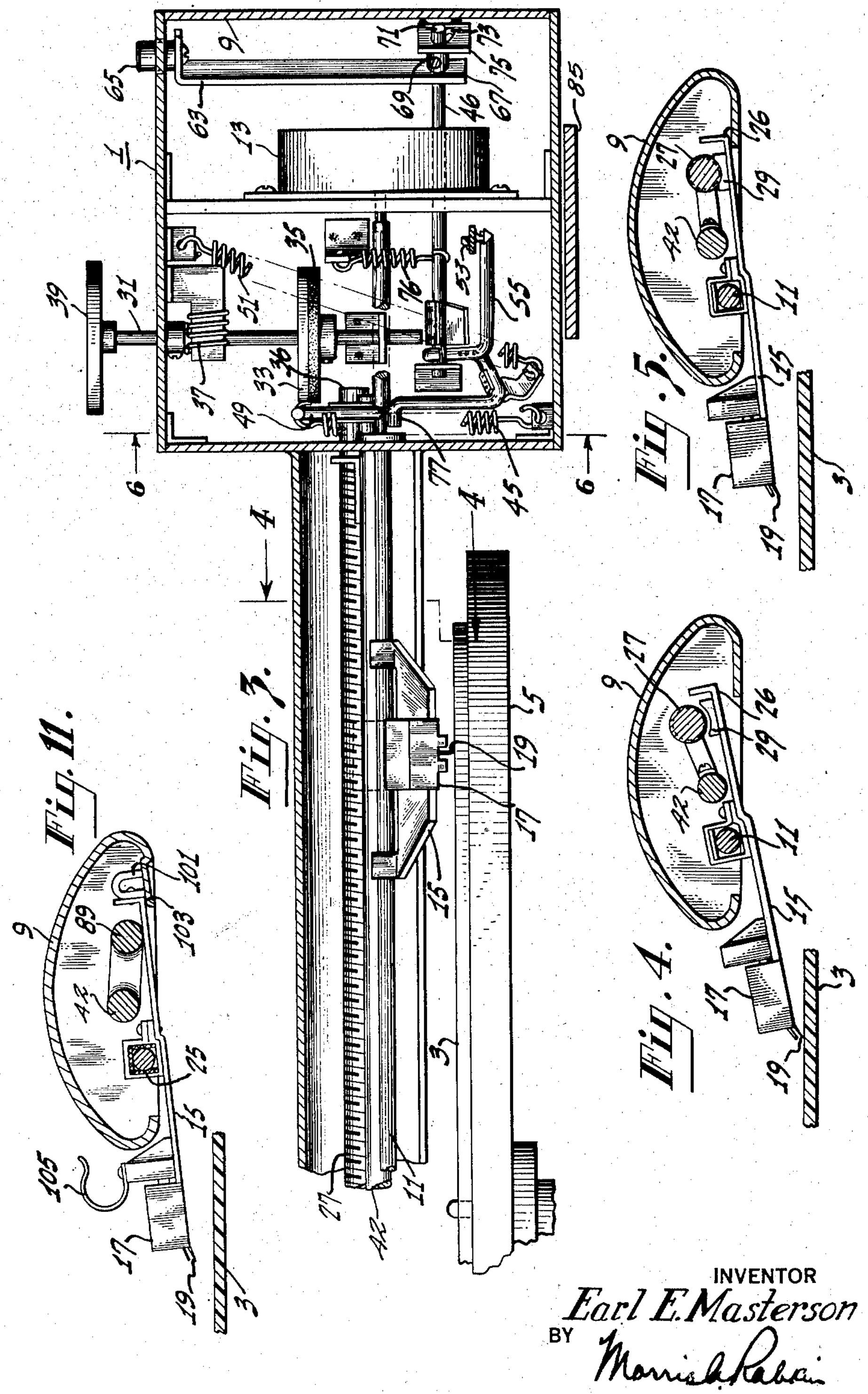

The novel features of my invention, as well as additional objects and advantages thereof, will be better understood from the following detailed description when read in connection with the accompanying drawings, in which:

Figure 1 is a top plan view of a sliding carriage pick-up assembly for a phonograph in accordance with my present invention and showing it disposed in playing position by solid lines and in nonplaying position by dot-and-dash lines with respect to a disc record, Figure 2 is a diagrammatic illustration of a pivoted tone arm including a damping device, this figure being included to facilitate an understanding of a certain feature of my invention, Figure 3 is an enlarged, fragmentary, sectional view of the sliding carriage pick-up assembly taken on the line 3—3 of Figure 1, Figure 4 is a sectional view taken on the line 4—4 of Figure 3 and showing the pick-up stylus in its engaged position on a phonograph record, Figure 5 is a view similar to Figure 4 but showing the pick-up stylus in its disengaged position with respect to a phonograph record.

Figures 6, 7, 8:
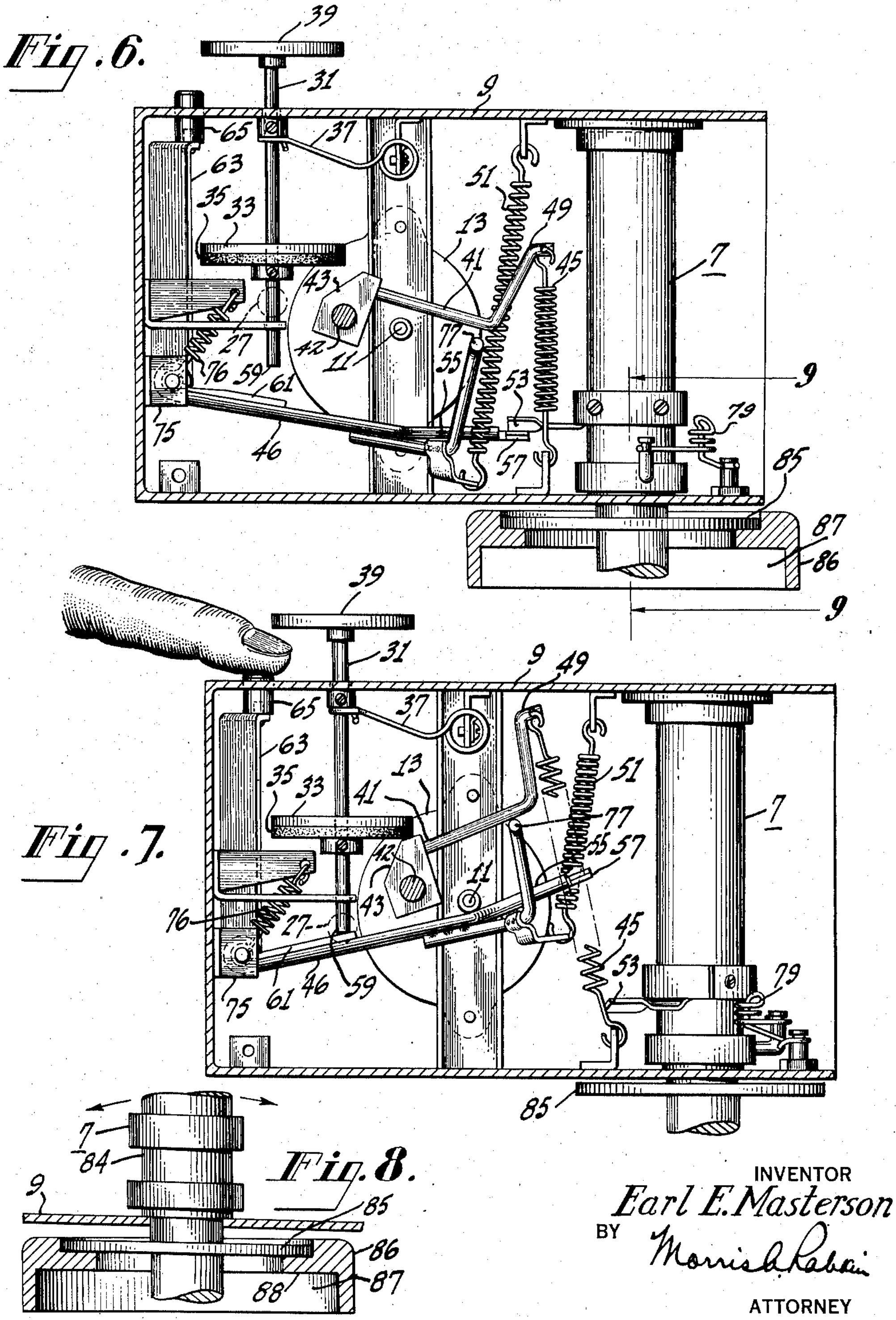

Figure 6 is a sectional view taken on the line 6—6 of Figure 3 and showing the apparatus in operating position, Figure 7 is a view similar to Figure 6 but showing the apparatus in a disengaged or inoperative position, Figure 8 is a side view, partly in section, of the pivotal support for the sliding carriage pick-up asembly provided with an adjustable collar, Figure 9 is a top plan view, similar to that of Figure 1, showing a modified form of disengaging means, Figure 10 is an enlarged, sectional view taken on the line 10—10 of Figure 9, and Figure 11 is a sectional view of a sliding carriage pick-up assembly similar to that shown in Figure 9 but provided with magnetic means for maintaining the carriage in a disengaged position.

Referring more particularly to the drawings, wherein similar reference characters designate corresponding parts throughout, there is shown, in Figures 1, and 3 through 8, a radial type sliding carriage pick-up assembly 1, in accordance with one embodiment of my invention, for use with a disc type phonograph record 3 when supported for rotation on a conventional phonograph turntable 5.

The sliding carriage pick-up assembly 1 comprises, generally, a vertical, pivotal support 7 attached by suitable means to a reference base of the phonograph in radial, spaced relation to the turntable 5 thereof, and a suitable frame or housing 9 which carries the reproducing apparatus and its associated guide members which extend from the pivotal support 7 in a radial direction over the turntable 5.

The reproducing apparatus and its associated guide members comprise a guide rod 11 which is preferably mounted for rotation on the frame or housing 9 and disposed in a radial direction over the turntable 5, the guide rod 11 being rotated by an electric motor 13 which is also mounted in the housing in any suitable manner. A carriage 15 comprising a light-weight framework is slidably mounted intermediate the ends thereof on the rotatable guide rod 11 for movement longitudinally thereof. On one end of the carriage 15, there is mounted a suitable sound reproducing head or pick-up 17 including a stylus 19 for engaging the grooved area of the phonograph record 3. In order to reduce friction between the guide rod 11 and the carriage 15 to a minimum, the contacting surfaces thereof should be as smooth as possible. In addition thereto, friction is also minimized by rotation of the guide rod 15, the principle thereof being well known, and disclosed by E. O. Brower in U. S. Patent 1,648,441, issued to him November 8, 1927. The effect produced as a result of the carriage sliding on the rotating guide rod may be compared to that produced by using a dash-pot 23 attached to a conventional, pivoted, pick-up arm 21, the principle thereof being illustrated in Figure 2 of the drawings. The dash-pot 23 comprises a cylinder 20 provided with an opening 22 at its closed end and containing a piston 24 which is connected to the pick-up arm 21 by a connecting rod or link 28. The dash-pot 23 prevents sudden or fast movement of the arm 21 about the pivot, but permits the arm to move slowly, at a constant rate of speed, in a smooth, substantially frictionless manner. Thus in my present invention, sudden or fast movement of the carriage 15 upon the guide rod 11 meets with resistance whereas normal, slow movement, resulting from the stylus 19 following the record groove will be unrestricted and will provide a smooth and substantially frictionless contact on the guide rod 11. If, however, it is desired to damp objectionable, resonant or other vibrations which may develop in the carriage assembly when the phonograph is in use, felt pads 25 may be disposed on the carriage in contact with the rotatable guide rod 11, in the manner shown in Figure 8 of the drawings.

Disengaging mechanism is also carried by the housing 9 for contact with the end 26 of the carriage 15 opposite that to which the pick-up 17 is attached for lifting and holding the stylus 19 off the record 3. The disengaging mechanism comprises a bar, rod, or other member 27 which is pivotally and rotatably mounted on the housing 9 in parallel, spaced relation to the rotatable guide rod 11, being disposed in a position such that, when the rod 27 is pivoted, it will engage the end 26 of the carriage 15 and force it downwardly toward the record 3, thereby tilting the carriage and raising the stylus 19 from the record.

The disengaging bar 27, according to one embodiment of my invention, as shown in Figures 1, and 3 through 8, comprises a rotatable lead screw. The end 26 of the carriage 15 which is contacted by the lead screw 27 is provided with a threaded bearing or half nut 29 which cooperates with the lead screw 27 upon engagement therewith and assists in moving the carriage 15 longitudinally on the rotatable guide rod 11 to a preselected position thereon when the lead screw 27 is rotated. A drive rod 31 is mounted vertically for rotation on the housing 9 adjacent the pivotal support 7 and has a disc clutch plate 33 attached adjacent the lower end thereof. The clutch plate 33 has a friction increasing member 35 attached to its lower surface and is disposed in a position such that the periphery thereof can be brought into engagement with the end 36 of the lead screw 27. The drive rod 31 is movable vertically and is normally biased upwardly in a disengaged position from the lead screw 27 by a spring 37 (Figures 6 and 7). A wheel 39 is attached at the upper end of the drive rod 31 which extends through the top of the housing 9. When it is desired to raise the stylus 19 from the record, the operator presses down on the wheel 39 a sufficient amount to engage the friction increasing member 35 with the end 36 of the lead screw 27. Pressing the wheel 39 and drive rod 31 still further downward forces the lead screw 27 to pivot downwardly into engagement with the half nut 29, tilting the carriage and lifting the stylus from the record. The drive rod 31 may then be rotated on its axis by means of the wheel 39 and, since the friction increasing member 35 is in contact with the end 36 of the lead screw 27, it will rotate the lead screw and move the carriage longitudinally along the guide rod 11. Remotely controlling the positioning of the sound reproducing head with respect to the record in this manner makes it possible to easily handle a light weight pick-up.

In order to maintain the stylus 19 in its disengaged position, a system of spring biased levers is provided. A lever arm 41 has one end 43 attached to the pivotal support 42 for the lead screw 27 adjacent the vertical support and extending perpendicular to the pivotal axis in a substantially horizontal position. The opposite end 49 of the lever arm 41 is free except for a spring 45 which normally biases the lever arm 41 downwardly and thereby maintains the lead screw 27 disengaged from the carriage end 26. A lifting lever 46 is also pivotally attached to the housing 9 adjacent one end thereof and has its opposite free end 77 disposed in a position to engage the lever arm 41 adjacent its free end 49. The lifting lever 46 is influenced upwardly by a spring 51 which is under tension when the apparatus is locked in operating position. The latch mechanism for locking the lifting lever 46 in its inoperative position comprises a narrow bar member 53 rigidly attached to the vertical support 7 and extending perpendicular thereto and adjacent to the base thereof. An extension 55 of the lifting lever 46 is located in a position such that the end 57 thereof will engage the narrow bar member 53 under its free end when the lifting lever 46 is forced to an extreme downward position (see Figure 6). In order to move the lifting lever 46 to its locked position under the bar member 53, the drive rod 31 is made long enough so that the lower end 59 thereof will engage a foot 61 attached to the pivoted end of the lifting lever 46 when the drive rod 31 is pressed downwardly a sufficient amount to force the lifting lever 46 into an inoperative position. The end 57 of the extension 55 will then slip past and under the bar member 53 to be engaged thereby and held in the position shown in Figures 3 and 6.

A latch releasing bar 63 is mounted on the housing 9 for vertical movement and has a push button 65 attached at its upper end, the push button extending through the top of the housing. The lower end 67 of the bar 63 is attached to an extension 69 of the pivoted end of the lifting lever 46. The extension 69 is disposed horizontally and has its free end 71 loosely inserted through an elongated opening 73 provided in a bracket 75 attached to a vertical wall of the housing 9. The opening 73 is disposed diagonally in the bracket 75 so that, when downward pressure is applied to the push button 65, the bar 63 will force the free end 71 of the lifting lever extension 69, which is normally biased upwardly by a spring 76, diagonally downward within the opening 73. This movement will cause the lifting lever 46 to move horizontally a sufficient amount to disengage the end 57 of the extension 55 from under the narrow bar member 53. The lifting lever 46 then being free to move upwardly, the spring 51 will force the free end 77 of the lifting lever 46 to engage the lever arm 41 and thereby rotate the lead screw 27 a sufficient amount to tilt the carriage 15 on the guide rod 11 and raise the stylus 19 from the record 3.

Inasmuch as the narrow bar member 53 is fixed to a rigid portion of the vertical pivot support 7 and the lever mechanism is carried by the housing 9, the lifting lever free end 57 will become disengaged from underneath the narrow bar member 53 when the sliding carriage pick-up assembly is moved more than a degree or two horizontally from its operating position over the turntable. Thus, the latch mechanism provides a safety device for the assembly and prevents damage to the record and reproducing mechanism in the event the stylus is not removed from the record prior to moving the sliding carriage pick-up assembly from its operative, solid-line position 81 of Figure 1 to its inoperative, dot-and-dash line position 83 of the same figure.

The sliding carriage pick-up assembly 1 is also provided with a toggle spring 79 which insures that the assembly is in either the operative position 81 or in the inoperative position 83 to one side of the turntable 5. This prevents an operator from leaving the arm part-way off of the turntable and then attempting to remove a record.

For the purpose of adjusting the sliding carriage pick-up assembly 1 with respect to the record 3 and turntable 5 to effect a parallel relationship, the stationary, vertical post 84 of the pivotal support 7 is provided with a disc-like base 85 adjacent its lower end. The disc-like base 85 is disposed in a plane normal to the axis of the pivotal support. Cooperating with the disc-like base 85 is a cylindrical collar 86 having a central opening 87 and a shoulder portion 88 disposed around the wall of the central opening. The top surface of the shoulder portion 88 lies in a plane disposed at a slight angle to a plane normal to the axis of the cylindrical collar 86, as shown in Figure 8 of the drawings. When assembled, the disc-like base 85 rests upon the top surface of the shoulder portion 88, and the bottom surface 90 of the collar 86 will rest upon the reference base of the phonograph, the stationary vertical post 84 being securely attached to the phonograph reference base. When it is desired to adjust the sliding carriage pick-up assembly 1 with respect to the turntable 5, the vertical post 84 is loosened slightly from the phonograph reference base and the collar 86 may be turned with respect to the post. When the collar is turned in one direction or the other, the shoulder portion 88 effects a rocking movement of the disc-like base 85 about the pivotal axis which causes the vertical post pivotal axis to change and thereby raise and lower the free end of the sliding carriage pick-up assembly with respect to the turntable. In this manner, the assembly can be adjusted to a parallel relation with respect to the turntable.

A simpler and preferred form of disengaging mechanism which can be constructed with a minimum number of parts, and which will also insure disengaging the stylus from the record when the assembly is moved from its operating position over the turntable is that illustrated in Figures 9 and 10. This particular embodiment eliminates the mechanical members employed for positioning of the carriage along the guide rod, as well as the complicated latch and lever mechanism employed in the embodiment shown in Figures 1, and 3 through 8.

Instead of the lead screw 27, a plain bar, rod, or other rigid, elongated member 89 is pivotally mounted on the housing 9 in the same manner as the lead screw 27 and is disposed in position to engage the free end of the carriage 15 thereby to tilt the carriage on the guide rod 11 and raise the stylus 19 from the record 3. An automatic disengaging member 91 comprising an L-shaped extension of the pivoted end of the rod 89 adjacent the pivotal support is disposed with a vertical leg 93 thereof downwardly and the other leg 95 perpendicular thereto and substantially parallel to the reference base of the phonograph. A vertically extending stop 97 is rigidly attached to the base 85 of the pivotal support in a position to engage the end of the extension leg 95 when the sliding carriage pick-up assembly is within a degree or two of its operative position. In this position, the rod 89 is out of contact with the end of the carriage 15, and a spring 99 attached between the housing 9 and the extension leg 93 is tensioned. The carriage is then in a lowered position with the stylus engaging the record. When the assembly is moved from its operating position, the end of the extension leg 95 is disengaged from the stop 97 and the spring 99 acts upon the L-shaped extension 91 and biases the rod 89 downwardly to engage the carriage 15 and lift the stylus 19 from the record 3. The carriage 15 and stylus 19 will thus be maintained in a disengaged position as long as the assembly is not in its operating position 81 with respect to the turntable.

In order to maintain the carriage in a tilted, inoperative position when the assembly is in its operating position over the turntable, a magnetic device is provided (see Figure 11). The magnetic device comprises a permanent magnet 101 attached to the end of the carriage which is engaged by the bar member 89 and an extension 103 of the housing which should be of magnetic material and disposed beneath the magnet in spaced relation thereto when the stylus 19 is in contact with the record 3, but in a position to be engaged by the magnet 101 when the stylus is lifted from the record.

In order that the carriage may be manually raised easily to a disengaged position with respect to the record, a hook 105 is mounted on the stylus end of the carriage.

From the foregoing description, it will be apparent to those persons skilled in the art that my present invention provides an improved sliding carriage pick-up assembly for phonographs which will insure withdrawal of the stylus from the phonograph record in the event the assembly is moved from its operating position over the turntable and thereby prevent damage to the record or the reproducing apparatus. It will also be apparent to those persons skilled in the art that changes and modifications apart from the embodiments of my invention shown and described herein are possible within the spirit of my invention. I therefore desire that the particular forms of my invention shown and described herein shall be considered as illustrative and not as limiting.

What is claimed is:

1. In a phonograph, the combination with a rotatable support for a grooved record, of a sliding carriage pick-up assembly comprising a guide rod supported for pivotal movement in a plane parallel to said rotatable support to a normal playing position radially with respect to said rotatable support, a carriage adapted to carry a pick-up adjacent to one end thereof for contact with the grooved area of said record, said carriage being mounted for longitudinal sliding movement on said guide rod and for tiltable movement with respect to said rotatable support, and magnetic means associated with said carriage for holding said carriage in a tilted position on said guide rod such that said pick-up is maintained out of contact with said record.

2. In a phonograph, the combination with a rotatable support for a grooved record of a sliding carriage pick-up assembly comprising a guide rod supported for pivotal movement in a plane parallel to said rotatable support to a normal playing position radially with respect to said rotatable support, a carriage adapted to carry a pick-up adjacent to one end thereof for engagement with the grooved area of said record mounted for longitudinal sliding movement on said guide rod and for tiltable movement with respect to said rotatable support, and means responsive to the pivotal movement of said guide rod away from its normal playing position for tilting said carriage on said guide rod to a position whereat said pick-up will be disengaged from said record.

3. The invention as set forth in claim 2 and wherein magnetic means are provided for maintaining said carriage in its said tilted position.

4. The invention as set forth in claim 2 wherein said responsive means comprises a member biased to exert a tilting force to said carriage in a direction to disengage said pick-up from said record.

5. In a phonograph, the combination with a rotatable support for a grooved record, of a sliding carriage pick-up assembly comprising a support pivotally mounted at one side of said rotatable support for movement in a plane substantially parallel thereto, a guide rod carried by said support and disposed in operative position with its longitudinal axis in spaced, substantially parallel relation with respect to a radius of said rotatable support, a carriage adapted to carry a pick-up adjacent to one end thereof for engagement with the grooved area of said record, said carriage being mounted intermediate its ends on said guide rod for slidable movement along said guide rod and for tiltable movement with respect to said rotatable support, and means mounted on said support parallel to said guide rod movable into and out of engagement with the other end of said carriage, said means being responsive to the pivotal movement of said guide rod away from its operative position for applying a tilting force to said carriage thereby to raise said pick-up from said record.

6. The invention as set forth in claim 5 wherein said tilting means comprises a rod-like member pivotally attached at its ends to said support for arcuate movement with respect to said guide rod.

7. The invention as set forth in claim 6 wherein said rod-like member has a lever arm attached adjacent to one end thereof and extending perpendicularly to the pivotal axis thereof, and wherein said support is provided with means exerting a tilting force adjacent to the free end of said lever arm thereby to rotate said lever arm and bring said rod-like member into engagement with said carriage other end and tilt said carriage and said pick-up to a disengaged position.

8. The invention as set forth in claim 7 wherein said rod-like member comprises a lead screw and wherein said other end of said carriage is provided with threaded means for engagement by said lead screw upon the application of said tilting force to said carriage, and wherein said support carries means for rotating said lead screw while said carriage and said pick-up are held in their tilted position whereby said carriage may be moved on said guide rod to a selected position upon said guide rod.

9. The invention as set forth in claim 8 and wherein said means for applying a rotating force to said lead screw comprises a clutch member rotatably mounted on said support and movable into and out of clutching engagement with an end of said lead screw whereby said lead screw may be rotated to move said carriage to said selected position on said guide rod.

10. The invention as set forth in claim 7 wherein said guide rod is rotatably mounted on said support, and wherein means for applying a rotating force to said guide rod is mounted on said support.

11. The invention as set forth in claim 5 wherein complementary magnetic means is mounted on said carriage and on said support which serves to maintain said carriage in its tilted position.

12. The invention as set forth in claim 5 wherein spring means is mounted on said support serving to bias said disengaging means into engagement with said carriage thereby to transmit said tilting force to said carriage.

13. The invention as set forth in claim 12 wherein latch means is provided on said support, said latch means being operative to prevent said spring means from exerting a biasing force on said disengaging means when said guide rod is in its operative position.

14. The invention as set forth in claim 13 wherein said latch means is arranged to release said spring means upon movement of said guide rod away from its operative position.

15. In a phonograph, the combination with a rotatable support for a grooved record of a sliding carriage pick-up assembly comprising a guide rod supported for pivotal movement in a plane parallel to said rotatable support to a normal playing position radially with respect to said support, a carriage adapted to carry a pick-up adjacent to one end thereof for engagement with the grooved area of said record mounted for longitudinal sliding movement on said guide rod for tilting movement to one or another of two positions, one in engagement with the record and the other out of engagement with the record, and means responsive to the pivotal movement of said guide rod away from its normal playing position for tilting said carriage on said guide rod to cause it to move to the second named one of said positions.

16. The invention as set forth in claim 15 wherein said responsive means comprises a member adapted to engage and actuate said carriage, and means for normally holding said actuating member out of engagement with said carriage.

EARL E. MASTERSON.

REFERENCES CITED

The following references are of record in the file of this patent:

UNITED STATES PATENTS

| Number | Name | Date |
|---|---|---|
| 1,930,286 | Runyan | Oct. 10, 1933 |
| 2,239,359 | Banning | Apr. 22, 1941 |
| 2,328,597 | Woolf | Sept. 7, 1943 |
| 2,346,071 | Guedon | Apr. 4, 1944 |
| 2,413,206 | Worsham | Dec. 24, 1946 |